US008103366B2

(12) United States Patent
Gamble et al.

(10) Patent No.: US 8,103,366 B2
(45) Date of Patent: Jan. 24, 2012

(54) APPARATUS AND METHOD FOR INSTALLING A FOAM PROPORTIONING SYSTEM IN EXISTING FIRE FIGHTING EQUIPMENT

(75) Inventors: Jonathan Gamble, Taylors Falls, MN (US); Harold McCabe, Roseville, MN (US)

(73) Assignee: Sta-Rite Industries, LLC, Delavan, WI (US)

( * ) Notice: Subject to any disclaimer, the term of this patent is extended or adjusted under 35 U.S.C. 154(b) by 152 days.

(21) Appl. No.: 12/234,625

(22) Filed: Sep. 20, 2008

(65) Prior Publication Data

US 2010/0071914 A1 Mar. 25, 2010

(51) Int. Cl.
*G05B 15/00* (2006.01)

(52) U.S. Cl. ............ 700/83; 700/282; 700/285; 169/44; 516/10

(58) Field of Classification Search .................. 700/275, 700/282, 285, 17, 83, 283; 169/14–16, 43, 169/7, 24, 27, 44, 46; 516/10
See application file for complete search history.

(56) References Cited

U.S. PATENT DOCUMENTS

| | | | | |
|---|---|---|---|---|
| 5,675,804 | A | 10/1997 | Sidik et al. | |
| 5,765,644 | A | 6/1998 | Arvidson et al. | |
| 6,357,532 | B1 * | 3/2002 | Laskaris et al. | 169/43 |
| 6,363,436 | B1 | 3/2002 | Hagy et al. | |
| 6,424,974 | B1 | 7/2002 | Cotner et al. | |
| 6,651,080 | B1 | 11/2003 | Liang et al. | |
| 2004/0050556 | A1 * | 3/2004 | Baker et al. | 169/15 |
| 2004/0055762 | A1 | 3/2004 | Arvidson et al. | |
| 2004/0177975 | A1 | 9/2004 | Laskaris et al. | |
| 2005/0155776 | A1 * | 7/2005 | Arvidson et al. | 169/14 |
| 2005/0172173 | A1 | 8/2005 | Page | |
| 2008/0133713 | A1 | 6/2008 | Samanta et al. | |

* cited by examiner

*Primary Examiner* — Kakali Chaki
*Assistant Examiner* — Nathan Laughlin
(74) *Attorney, Agent, or Firm* — Quarles & Brady LLP

(57) ABSTRACT

A method and apparatus for installing a foam proportioning system into existing fire fighting equipment is provided. The method can include installing a foam proportioning library into a first application of a processor of the existing fire fighting equipment and installing a foam proportioning support into a second application of a display of the existing fire fighting equipment. The method can also include connecting a foam proportioner to the processor, receiving user inputs with the display, and processing the user inputs with the second application and the foam proportioning support. The method can further include transmitting the user inputs to the processor and operating the foam proportioner in response to the user inputs with the first application and the foam proportioning library.

14 Claims, 2 Drawing Sheets

APPARATUS AND METHOD FOR INSTALLING A FOAM PROPORTIONING SYSTEM IN EXISTING FIRE FIGHTING EQUIPMENT

BACKGROUND

FIG. 1 illustrates how existing fire fighting equipment is typically upgraded with a foam proportioning system (FPS) 18. The existing fire fighting equipment can include a programmable logic controller (PLC) 10 controlled by a library 12, which receives input by communicating with a support element 14 of a display 16. The FPS 18 can include a foam proportioner 20 and a controller 22 with a display 24. The controller 22 must be linked to the fire apparatus PLC 10 and the fire apparatus display 16 with a communication line 26. Because no modifications to the fire apparatus PLC 10 are generally performed, the fire apparatus PLC 10 may not be able to communicate with the foam proportioner's controller 22, resulting in the possibility of duplicate input signals.

SUMMARY

Some embodiments of the invention provide a method of installing a foam proportioning system into existing fire fighting equipment. The method can include installing a foam proportioning library into a first application of a processor of the existing fire fighting equipment and installing a foam proportioning support into a second application of a display of the existing fire fighting equipment. The method can also include connecting a foam proportioner to the processor, receiving user inputs with the display, and processing the user inputs with the second application and the foam proportioning support. The method can further include transmitting the user inputs to the processor and operating the foam proportioner in response to the user inputs with the first application and the foam proportioning library.

DETAILED DESCRIPTION

Figure 1:
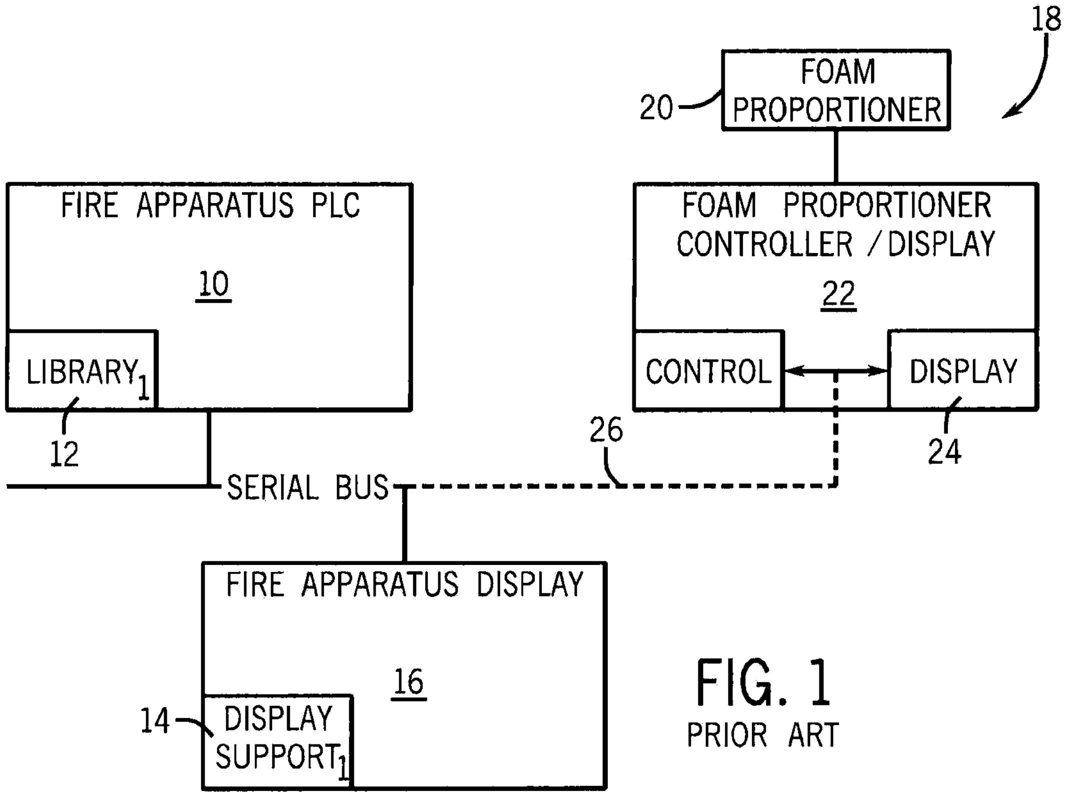
FIG. 1 PRIOR ART
FIG. 1 is a schematic illustration of a foam proportioner system being installed into an existing fire apparatus according to the prior art.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures depict selected embodiments and are not intended to limit the scope of embodiments of the invention. Skilled artisans will recognize the examples provided herein have many useful alternatives and fall within the scope of embodiments of the invention.

The following description refers to elements or features being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the schematic shown in FIG. 2 depicts one example arrangement of processing elements, additional intervening elements, devices, features, or components may be present in an actual embodiment (assuming that the functionality of the system is not adversely affected).

The invention may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices.

In accordance with the practices of persons skilled in the art of computer programming, the present disclosure may be described herein with reference to symbolic representations of operations that may be performed by the various computing components, modules, or devices. Such operations are sometimes referred to as being computer-executed, computerized, software-implemented, or computer-implemented. It will be appreciated that operations that are symbolically represented include the manipulation by the various microprocessor devices of electrical signals representing data bits at memory locations in the system memory, as well as other processing of signals. The memory locations where data bits are maintained are physical locations that have particular electrical, magnetic, optical, or organic properties corresponding to the data bits.

Figure 2:
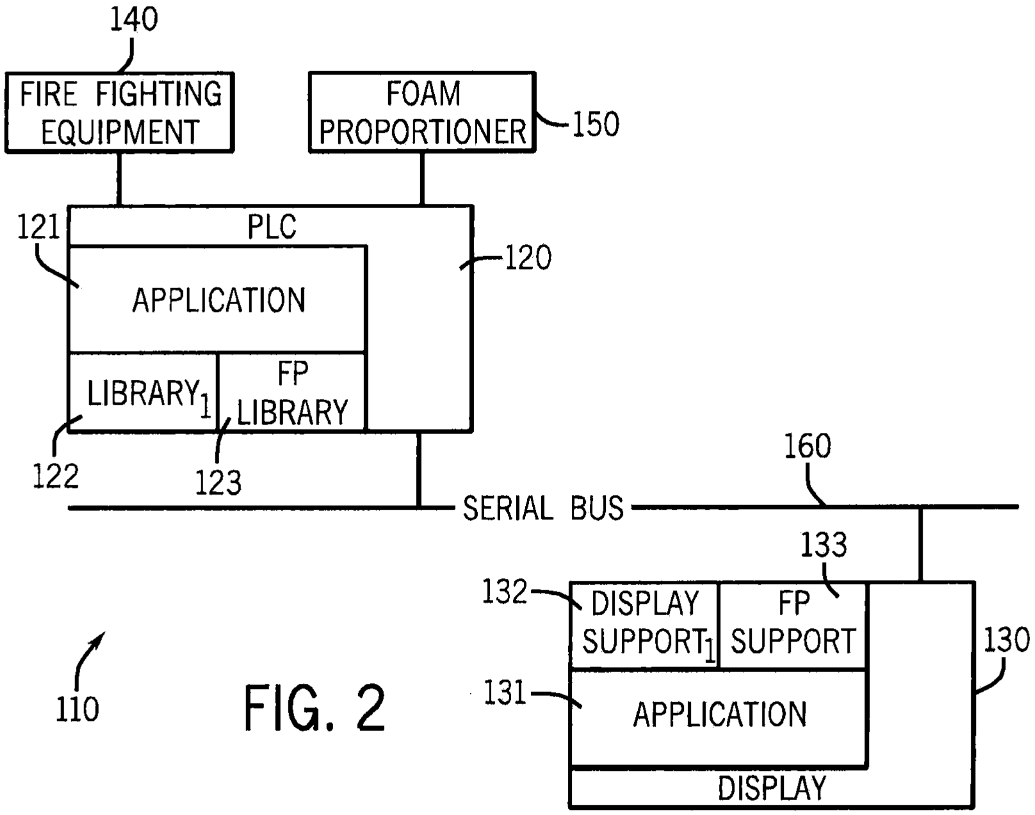
FIG. 2 is schematic illustration of a foam proportioning system with a headless library installed in an existing fire apparatus.

FIG. 2 illustrates a fire apparatus system 110 according to one embodiment of the invention. The fire apparatus system 110 can include a processor 120, a display 130, existing fire fighting equipment 140, and a foam proportioner 150. The existing fire fighting equipment 140 can include new fire fighting equipment that does not include a foam proportioner or old fire fighting equipment that does or does not include a foam proportioner. In addition to or alternatively from the foam proportioner 150, some embodiments of the invention can be used in conjunction with power-fill applications, concentrate management applications, valve control applications, etc. The processor 120 can run a first application 121 to control the operation of fire fighting equipment 140. The first application 121 can also use a foam proportioning library 123 to control a foam proportioner 150.

The processor 120 may be implemented with a suitable type of programmable logic controller (PLC), microprocessor, digital signal processor, application specific integrated circuit (ASIC), field programmable gate array (FPGA), or other integrated or discrete logic circuitry programmed or otherwise configured to provide functionality as described herein. The processor 120 executes instructions stored in digital memory to provide the functionality as described below. Instructions provided to the processor 120 may be executed in any manner, using any data structures, architecture, programming language and/or other techniques. Digital memory is any storage medium capable of maintaining digital data and instructions provided to the processor 120, such as a static or dynamic random access memory (RAM), or any other electronic, magnetic, optical or other storage medium. In some embodiments, the foam proportioner 150 is "headless" in that it may not include an integrated display, but rather uses a display of the existing fire fighting equipment 140.

In some embodiments, the display 130 can be a unit separate from the processor 120. The display 130 can be used to display much of the information necessary to control and operate the equipment and features of the fire fighting equipment 140, not merely the foam proportioner 150. The display 130 can process user inputs with a display support 132 of a second application 131. The display 130 can communicate commands to the processor 120 via a serial bus 160, which can be a CANBus, an ethernet link, a wireless connection, or another suitable type of communication link.

In order for the processor 120 to operate the foam proportioner 150, a foam proportioning library 123 can be implemented into the first application 121. Similarly, the second application 131 of the display 130 can be updated with a foam proportioning support 133. User inputs regarding the control of the foam proportioner 150 can be processed by the application 131 of the display 130 and sent to the processor 120 via the serial bus 160. The first application 121 of the processor 120, in turn, is able to interpret these commands due to the installed foam proportioning library 123 and can control the foam proportioner 150 accordingly.

Since both the foam proportioning library 123 and the foam proportioning support 133 use spare capacity of the processor 120 and the display 130, respectively, no additional electronic hardware is required to be installed, in some embodiments. The operation of the system as known by the user is identical, except the addition of the new features, which helps keep training requirements for operation of the fire apparatus system 110 with the foam proportioner 150 to a minimum. Also, upon arrival at the scene of a fire, the time before the foam proportioner 150 can be activated can be reduced based on the simplified operation of the foam proportioner 150 (e.g., using an integrated auto-start feature).

Figure 3:
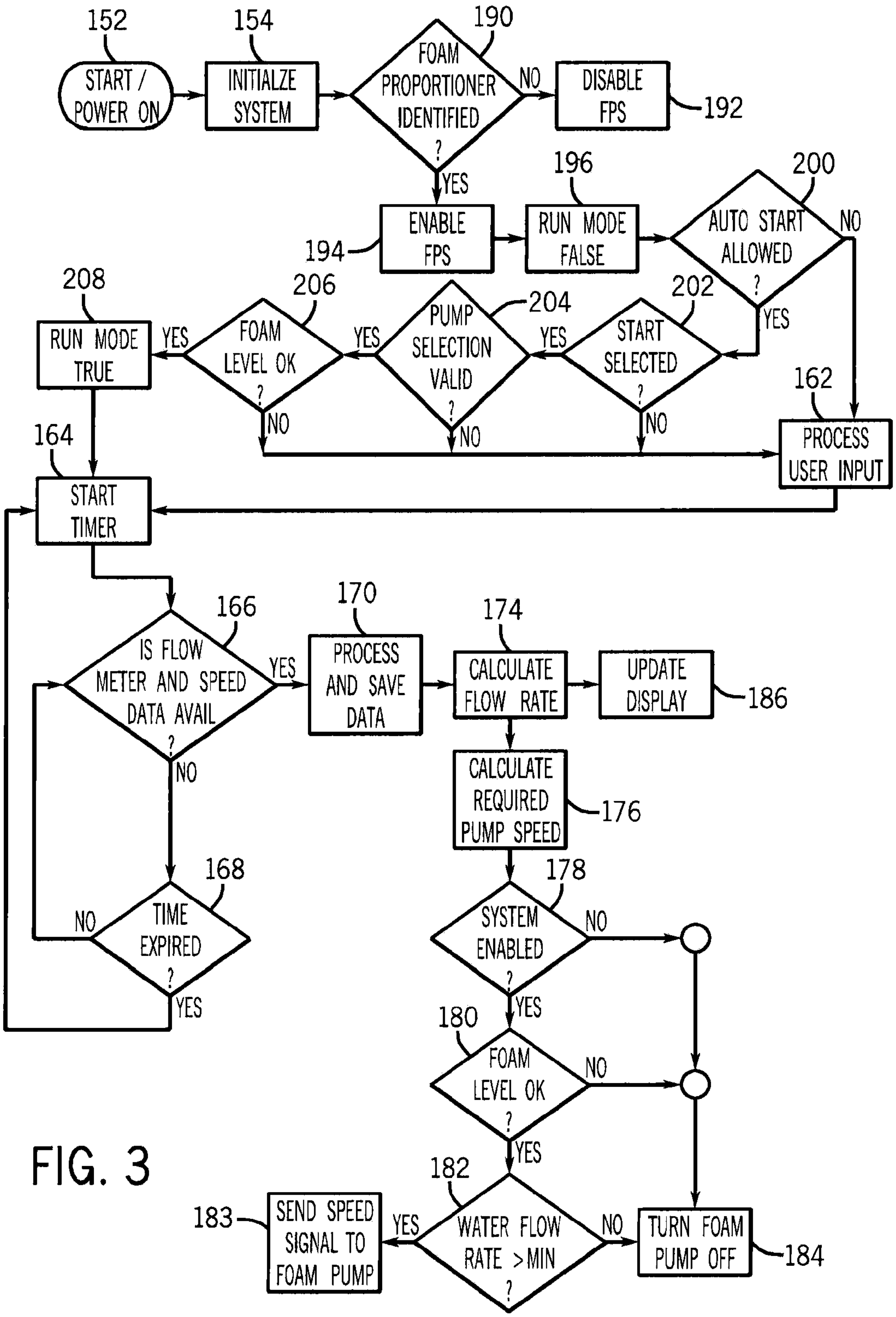
FIG. 3 is a flow chart of a control logic algorithm implemented by the headless library of FIG. 2 according to one embodiment of the invention.

Once the foam proportioning library 123 and the foam proportioning support 133 are implemented in the processor 120 and the display 130, respectively, their operations can be executed as shown in FIG. 3. The various tasks performed in connection with process shown in FIG. 3 may be performed by software, hardware, firmware, or any combination thereof. For illustrative purposes, the following description of the process of FIG. 3 may refer to elements mentioned above in connection with FIG. 2. In practical embodiments, portions of the process of FIG. 3 may be performed by different elements of the described system. It should be appreciated that the process of FIG. 3 may include any number of additional or alternative tasks, the tasks shown in FIG. 3 need not be performed in the illustrated order, and the process may be incorporated into a more comprehensive procedure or process having additional functionality not described in detail herein.

When power is first applied (at 152) to the fire apparatus system 110, the initialization steps for the type of processor 120 employed are performed (at 154). The processor 120 then awaits (at 190) identification of a foam proportioner 150. If no valid foam proportioner 150 could be found, the foam proportioner library 123 and the foam proportioner support 133 are disabled (at 192) and no foam proportioning becomes available. When a valid foam proportioner 150 can be identified by the foam proportioner library 123, the foam proportioner 150 is enabled (at 194). Based on data submitted by the foam proportioner 150 (e.g., number of foam pumps, number of foam tanks, etc.) the foam proportioner library 123 configures its function calls for optimal performance. For simplification, the fire apparatus system 110 is described herein as having one foam pump and one tank. Those skilled in the art will be able to adapt the invention in order to account for different configurations of the fire apparatus system 110 with the described apparatus and method.

Once the foam proportioner 150 is enabled, the run mode of the pump of the foam proportioner 150 is set to false (at 196) to either operate an auto-start sequence or await user input. If the processor 120 detects (at 200) that the auto-start mode can be executed, a series of tests can be passed before the run mode of the foam proportioner 150 is engaged (at 208) and the foam addition process is initiated. The sequential tests necessary to activate the foam proportioner 150 can include a test to see if the auto-start mode is activated (at 202), a test to see if the selected water pump is valid (at 204) (e.g., no errors due to exceeding a temperature limit, for example, have been detected by the processor 120), and a test to see if enough additive is available for the selected water pump (at 206). If the processor 120 detects that an auto-start mode is not allowed (at 200), the processor 120 awaits user input (at 162). Once the processor 120 receives the user input for starting the foam proportioner 150, the foam proportioning support 133 processes the user input and communicates the relevant data for the foam proportioner 150 to the processor 120.

Independent of the start sequence (automatic or manual), the processor 120 initiates a time interval (at 164). On a repetitive time interval, a test is made (at 166) to determine whether a flow rate signal is available from a flow meter of the fire apparatus system 110 whether a speed signal is available and from the foam proportioner 150. The speed signal can represent the speed of the motor controlling the injector pump of the foam proportioner 150. If the flow rate signal and the speed signal are not available, a further test can be made (at 168) to determine whether the time interval has expired. If the time interval has not expired, the operation continues until the timer has timed out.

The flow rate signal and the speed signal obtained during each time interval are processed and stored (at 170). A calculation is made (at 174) of the flow rate of the water pumped based on the flow rate signal and transmitted (at 186) to the display 130. In this way, fire fighting personnel can be aware of the total number of gallons poured into a burning structure so that consideration can be given to the weight factor and the likelihood that the burning structure may collapse.

Based on the flow rate and the current speed at which the injector pump of the foam proportioner 150 is operated, the processor 120 calculates (at 176) an updated speed value for the injector pump of the foam proportioner 150 in order to achieve the desired concentration of the water-foamant mixture. The motor controlling the injector pump of the foam proportioner 150 can then be turned on (at 183) and driven at the speed computed by the processor 120 provided three tests are satisfied. The three tests can include a test to see if the system is enabled (at 178) (i.e., no additional error is communicated to the processor 120 from the foam proportioner 150), a test to see if the foam tank is empty (at 180), and a test to see if the water flow rate is sufficient (at 182). If the system is disabled (at 184) due to an error detected by the processor 120, the motor of the injector pump of the foam proportioner 150 can be shut down.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

The invention claimed is:

1. A method of installing a foam proportioning system into existing fire fighting equipment, the method comprising:

installing a foam proportioning library into a first application of a processor of the existing fire fighting equipment;

installing a foam proportioning support into a second application of a display of the existing fire fighting equipment;

connecting a foam proportioner to the existing fire fighting equipment;

receiving user inputs with the display;

processing the user inputs with the second application and the foam proportioning support;

transmitting the user inputs to the processor;

operating the foam proportioner in response to the user inputs with the first application and the foam proportioning library.

2. The method of claim 1 and further comprising installing a foam proportioning library into a first application of a programmable logic controller of the existing fire fighting equipment.

3. The method of claim 1 and further comprising attempting to identify a valid foam proportioner and disabling the foam proportioning library and the foam proportioning support if a valid foam proportioner is not identified.

4. The method of claim 1 and further comprising operating an automatic start sequence.

5. The method of claim 4 and further comprising determining if a selected water pump is valid before operating the automatic start sequence.

6. The method of claim 4 and further comprising determining if enough foam additive is available before operating the automatic start sequence.

7. The method of claim 1 and further comprising obtaining a flow rate signal from a flow meter and a speed signal from the foam proportioner.

8. A foam proportioning system for installation into existing fire fighting equipment, the foam proportioning system comprising:

a foam proportioner for connecting to the existing fire fighting equipment;

a processor of the existing fire fighting equipment, the processor connected to the foam proportioner, the processor including a first application and a foam proportioning library; and a display of the existing fire fighting equipment, the display including a second application and a foam proportioning support, the display receiving user inputs, the display processing the user inputs with the second application and the foam proportioning support, the display transmitting the user inputs to the processor;

the processor operating the foam proportioner in response to the user inputs with the first application and the foam proportioning library.

9. The system of claim 8 wherein the processor includes a programmable logic controller.

10. The system of claim 8 wherein the processor attempts to identify a valid foam proportioner and disables the foam proportioning library and the foam proportioning support if a valid foam proportioner is not identified.

11. The system of claim 8 wherein the processor operates an automatic start sequence.

12. The system of claim 11 wherein the processor determines if a selected water pump is valid before operating the automatic start sequence.

13. The system of claim 11 wherein the processor determines if enough foam additive is available before operating the automatic start sequence.

14. The system of claim 8 wherein the processor obtains a flow rate signal from a flow meter and a speed signal from the foam proportioner.

* * * * *